United States Patent [19]  [11] 3,964,073
Kobori et al. [45] June 15, 1976

[54] EXPOSURE CONTROL DEVICES FOR PHOTOGRAPHIC CAMERAS

[75] Inventors: Toshio Kobori, Sakai; Kayoshi Tsujimoto, Osaka; Yasuhiro Nanba; Seiji Yamada, both of Sakai, all of Japan

[73] Assignee: Minolta Camera Kabushiki Kaisha, Osaka, Japan

[22] Filed: July 8, 1974

[21] Appl. No.: 486,427

[30] Foreign Application Priority Data
July 17, 1973 Japan............................. 48-81089

[52] U.S. Cl................................. 354/29; 354/36; 354/37; 354/38; 354/43; 354/60 R
[51] Int. Cl.²..................... G03B 7/14; G03B 7/08
[58] Field of Search.................. 354/29, 36, 37, 38, 354/39, 43, 60 R, 60 E

[56] References Cited
UNITED STATES PATENTS
3,292,516 12/1966 Sato et al............................. 354/38

*Primary Examiner*—L. T. Hix
*Assistant Examiner*—Russell E. Adams, Jr.
*Attorney, Agent, or Firm*—Watson, Cole, Grindle & Watson

[57] ABSTRACT

An exposure control device for a photographic camera uses a conventional exchangeable lens and achieves a highly accurate exposure control commensurate with a pre-selected shutter speed by a light measuring device measuring scene light transmitted through the objective lens, diaphragm, and exchangeable lens. The device also permits exposure control commensurate with a pre-adjusted diaphragm aperture by storing the output from the light measuring device determined with the adjusted diaphragm aperture to control the shutter speed. However, when the device controls the exposure with a pre-selected shutter speed, the output from the light measuring device produced with a fully open diaphragm aperture is compared with the output produced commensurate with the pre-selected shutter speed to thereby control the diaphragm aperture in shifting from its open position to its closed position, and then stores the output from the light measuring device with the adjusted diaphragm aperture to thereby control the shutter speed.

12 Claims, 7 Drawing Figures

EXPOSURE CONTROL DEVICES FOR PHOTOGRAPHIC CAMERAS

BACKGROUND OF THE INVENTION

This invention relates to an exposure control device for a photographic camera which uses a known, conventional, exchangeable lens and is provided with a light measuring device adapted to measure scene light which has been transmitted through an objective lens and a diaphragm, and more particularly to such a device which, at a preselected shutter speed, effects the exposure control by adjusting the diaphragm commensurate with the pre-selected shutter speed and then controlling the shutter speed commensurate with the adjusted diaphragm.

With the conventional exposure control mechanism set at a shutter speed beforehand, in which the diaphragm aperture is determined according to the position of a meter pointer, an error may occur in the diaphragm aperture setting, if the meter pointer is positioned midway between two adjacent positions due to the pointer holding member which should hold the pointer at its correct deflected position. Moreover, with a conventional exposure control of the type, in which an electromagnet locks the diaphragm which is to be actuated electrically, an error is likely to occur in the adjustment of the diaphragm aperture, because of the timing lag between diaphragm-locking and the operation of the electromagnet. In either case, whether the diaphragm aperture is controlled in accordance with the position of the meter pointer, mechanically or electromagnetically, the shutter is operated at the selected speed, irrespective of the error in the diaphragm aperture adjustment and thus, an error is necessarily introduced into the exposure to be controlled.

Also, with the conventional exposure control device for controlling exposure by adjusting the diaphragm aperture, based on a pre-selected shutter speed, there still remains a problem. Namely, optimum exposure may not be obtained, even if the diaphragm aperture is adjusted to a minimum aperture value at a selected shutter speed. Conversely, when the photographic object is too dark, there may not be obtained an optimum exposure, even if the diaphragm is fully opened at a selected shutter speed. In such instances either excessive exposure or insufficient exposure will result, because the shutter will be operated at the selected speed, even if the diaphragm is adjusted to its minimum aperture value or even if the diaphragm is fully opened.

Accordingly, the present invention overcomes the aforementioned errors which are necessarily inherent in a conventional diaphragm control device used in an exposure control device of the type in which the diaphragm aperture is controlled and the shutter speed is selected beforehand.

SUMMARY OF THE INVENTION

The exposure control device according to the present invention uses a conventional exchangeable lens and a shutter speed control device for storing the output voltage of a light measuring device for measuring the scene light which has been transmitted through an objective lens and the diaphragm, and a diaphragm control device for controlling the diaphragm aperture setting commensurate with the aforesaid output voltage. The selected shutter speed and the sensitivity of the film are also factors, whereby in case the exposure is controlled according to a selected shutter speed, the diaphragm aperture is optionally controlled according to the brightness of the object, and commensurate with the shutter speed thereby adjusted, the shutter speed control device controls the shutter speed so as to accommodate the adjusted diaphragm aperture in accordance with the brightness of an object, based on the signal voltage stored.

According to the first aspect of the present invention, wherein the shutter speed is selected beforehand, the light measuring device measures the scene light, with the diaphragm of a conventional exchangeable lens adjusted from its full open position to its pre-adjusted diaphragm aperture setting, and then the diaphragm control device controls the diaphragm aperture to obtain an optimum output from the light measuring device, commensurate with the selected shutter speed and sensitivity of the film used. In this respect, when the optimum diaphragm aperture is not obtained for the brightness of an object and the selected shutter speed, the diaphragm control device adjusts the diaphragm aperture closest to the optimum diaphragm aperture and then the light measuring device measures the scene light subsequent to the aperture adjustment. The stored output voltage of the light measuring device is used by the speed control device to control the shutter exposure speed.

The second aspect of the present invention is that with the controlled exposure, with the shutter speed selected beforehand, the shutter speed is not necessarily the same as the pre-selected shutter speed.

The third aspect of the present invention is that an optimum exposure control is achieved according to that shutter speed closest to the selected shutter speed and to a diaphragm aperture optimized in accordance with the aforesaid shutter speed, even though an optimum diaphragm aperture setting is not obtained for the selected shutter speed as well as for the brightness of an object because the shutter speed thus selected is not identical to the final shutter speed to be controlled upon exposure.

The fourth aspect of the present invention is that, when controlling the exposure by controlling the shutter speed by adjusting the diaphragm aperture beforehand, there is provided a light-measuring-output voltage commensurate with the diaphragm aperture to be adjusted according to the measured scene light, and then the output voltage is stored, whereby the shutter speed is controlled at an optimum speed, based on the voltage thus stored.

OBJECTS OF THE INVENTION

It is a principal object of the present invention to provide an exposure control device for a photographic camera using a conventional exchangeable lens, wherein the diaphragm aperture is controlled, with the shutter speed selected beforehand and which eliminates errors in exposure control caused by incorrect diaphragm aperture adjustment.

It is another object of the present invention to provide an exposure control device for a photographic camera which controls the diaphragm to a fully open diaphragm aperture or to a pre-adjusted diaphragm aperture and controls the shutter speed with respect to the adjusted diaphragm aperture, thereby effecting optimum exposure control, even if the diaphragm adjustment for obtaining an optimum diaphragm aperture commensurate with the brightness of an object is impossible at the selected shutter speed.

It is a further object of the present invention to provide an exposure control device for a photographic camera which enables multi-program exposure control, wherein with the diaphragm aperture controlled and the shutter speed selected beforehand, the photographer intentionally sets either the diaphragm aperture of the shutter speed, with the other being automatically controlled, so as to control the shutter speed at a speed higher than the speed with the minimum diaphragm aperture, with the pre-adjusted diaphragm aperture set to a larger value than the minimum diaphragm aperture.

These and other objects and features of the present invention will be apparent from the following specification with reference to the accompanying drawings which indicate the preferred embodiments of the present invention.

DETAILED DESCRIPTION OF THE PREFERRED EMBODIMENTS

Figure 1:
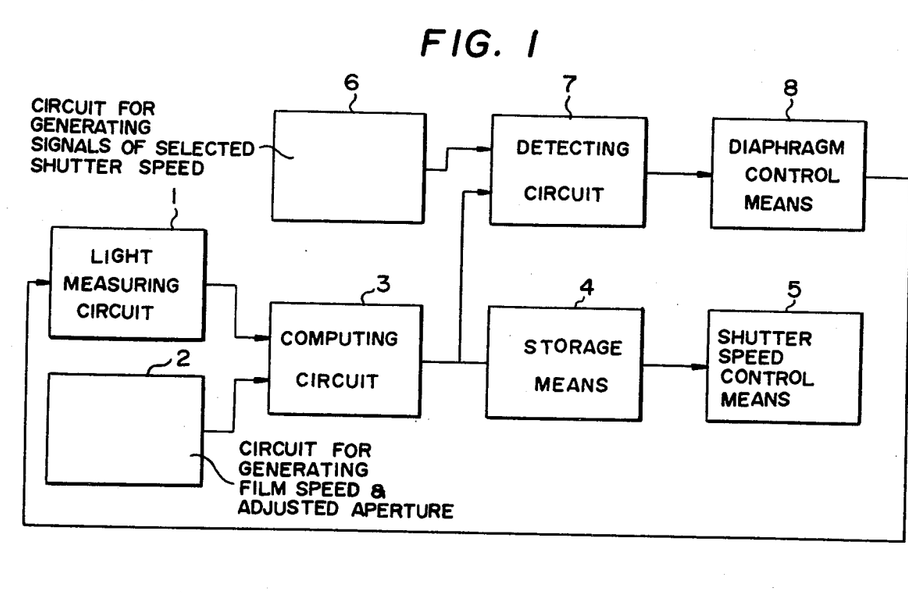
FIG. 1 is a block diagram illustrating an exposure control device for a photographic camera according to the present invention.

With respect to FIG. 1, light measuring circuit 1 measures the scene light which has been transmitted through an objective lens and the diaphragm of the camera, to thereby produce a light measuring output signal commensurate with the intensity of the scene light. Circuit 2 supplies information such as the sensitivity of the film used and a signal commensurate with the adjusted diaphragm aperture setting. Computing circuit 3 produces a signal associated with the shutter speed control by operating on signals from light measuring circuit 1 and circuit 2. Storage circuit 4 stores the output from computing circuit 3. Shutter speed control circuit 5, to which is provided the voltage stored by storage circuit 4 as an input, controls the shutter speed commensurate with the stored voltage.

Circuit 6 produces a signal commensurate with the pre-selected shutter speed and its output signal as well as the output signal from computing circuit 3 are input to detecting circuit 7 which detects the difference between both input signals. An output from detecting circuit 7 is input to diaphragm control 8 which adjusts the diaphragm aperture. Thus, a signal representing the controlled diaphragm aperture is fed back to light measuring circuit 1.

More specifically, where the diaphragm aperture is adjusted beforehand to control the shutter speed, both stopped-down light measuring and full open light measuring are effected. For stop-down light measuring, the diaphragm is set to a pre-adjusted diaphragm aperture, after which the output from the light measuring circuit at this time and information as to the sensitivity of the film used from circuit 2 operate shutter speed control circuit 5 through storage circuit 4, in accordance with the output from computing circuit 3.

In contrast thereto, for exposure control, with the shutter speed selected beforehand, an output from light measuring circuit 1 and the film sensitivity from circuit 2 are input to computing circuit 3, whereby the output therefrom is input to detecting circuit 7, whereupon an output signal from circuit 6 is provided to detecting circuit 7. Thus, diaphragm control 8 is first operated according to a signal from detecting circuit 7 depending on the difference between both inputs thereto, and then the diaphragm which has been in its fully open position is set to an optimum diaphragm aperture with respect to the selected shutter speed, after which an output from light measuring circuit 1 at the aforesaid diaphragm aperture and in accordance with the film sensitivity from circuit 2 are input to computing circuit 3, whereby shutter speed control circuit 5 is operated through storage circuit 4 to control the diaphragm aperture and shutter speed.

Figure 2:
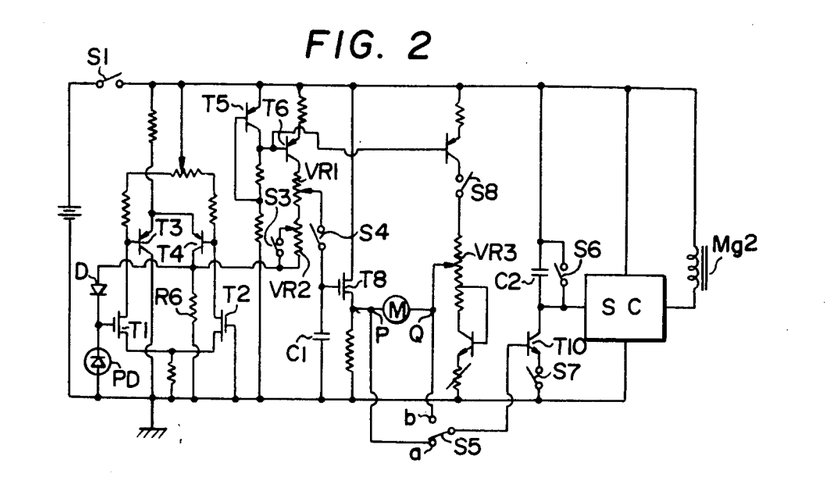
FIG. 2 is a schematic of the first embodiment of the present invention.

FIG. 2 shows a schematic of the first embodiment of the present invention, based on the system illustrated in FIG. 1. Photo-diode PD measures the scene light which has been transmitted through an objective lens and diaphragm and one terminal thereof is connected to the gate of field effect transistor (FET) T1 on the input side of a differential amplifying circuit consisting of FETs T1 and T2 plus transistors T3 and T4, and that terminal receives negative feedback from the collector of transistor T4 through diode D.

A current proportional to the incident light flows through photo-diode PD, and diode D logarithmically converts the current flowing through photo-diode PD. The voltage across diode D is such that the photoelectric current of photo-diode PD is logarithmically compressed, and appears as a voltage across resistor 6, i.e., the collector of transistor T4 is an output terminal of the light measuring circuit. The reasons for the logarithmic compression are to effect photographic computation in the form of addition in computing circuit 3 and to facilitate storage of computed output signals.

Potentiometers VR1 and VR2 constitute circuit 2 and are connected to computing circuit 3. Potentiometer VR1 provides the film sensitivity data, while potentiometer VR2 supplies the diaphragm aperture setting which has been adjusted beforehand. In the case of full open diaphragm light measuring, such data is necessary, while in the case of stopped-down diaphragm light measuring, the diaphragm aperture setting is input to the light measuring circuit, so that the diaphragm aperture is not computed by opening switch S3. Potentiometer VR1 is connected serially to potentiometer VR2, and the computed output of computing circuit 3 is produced at the variable terminal of potentiometer VR1. Transistors T5 and T6 compensate for the temperature characteristics of diode D.

Capacitor C1 is connected by switch S4 to the output of computing circuit 3 and stores the output from the computing circuit. Accordingly, switch S4 is opened immediately before shifting of the movable mirror of a camera from its viewing position to its picture taking position.

Switch S5 is normally set to contact $a$ and, when switched to contact $b$, switch S5 controls the shutter speed with the shutter selected, as is known to those skilled in the art. The circuits which have been described thus far are incorporated in the body proper of a camera.

When controlling the exposure, with the diaphragm aperture adjusted beforehand, in the case of fully open diaphragm light measurement, a shutter speed control signal computed according to (i) the output of light measuring circuit 1, (ii) the film sensitivity from circuit 2 and (iii) the preset diaphragm aperture which has been adjusted beforehand with switch S3 closed, are stored in capacitor C1 when switch S4 is opened. However, in the case of stopped-down diaphragm light measuring with switch S3 opened, the shutter speed control signal computed according to (i) an output from light measuring circuit 1 with the diaphragm aperture set to the adjusted diaphragm aperture and (ii) the film sensitivity from circuit 2, are stored in capacitor C1 when switch S4 is opened. In either case, the voltage stored in the storing capacitor in the aforesaid manner is provided to the base of transistor 10 via FET T8 and antilogarithmically converted by transistor 10. Trigger switch S7 is closed simultaneously with the commencement of the exposure, and the collector current from transistor 10 is charged by integrating capacitor C2. When capacitor C2 is charged to a given level, then switching circuit SC is operated to thereby interrupt the exciting current to electromagnet Mg2, thus completing the exposure.

Also in the case of exposure control, with the shutter speed selected beforehand, switch S5 is closed on contact a, while switch S3 is maintained open. Potentiometer VR3 sets the shutter speed which is manually selected, while a shutter speed signal voltage is produced at point Q connecting with the movable potentiometer terminal. Voltmeter M indicates the voltage difference between output point P and point Q of FET T8, and the diaphragm is controlled by means of a detecting mechanism which detects the deflected position of the pointer of voltmeter M. In the initial stage of the depression of the shutter button, light measuring is effected, and with the diaphragm being fully opened, the computed value of the light measurement output and the film sensitivity are input to the gate of FET T8. This value corresponds to the shutter speed of the fully open diaphragm, while FET T8 is used as an emitter follower, thus the proper voltage will appear at point P, whereby the pointer of meter M will be deflected commensurate with the difference between the above computed value and the value corresponding to the manually selected shutter speed at point Q. Thus, as the shutter button is being depressed, the pointer of meter M is clamped, whereby the position of the deflected pointer is detected so that the diaphragm is adjusted from its fully open position. After the diaphram has been adjusted, the output from the light measuring circuit conforms to the adjusted diaphragm aperture, so that the voltage stored in storing capacitor C1 is the voltage corresponding to the shutter speed with an automatically stopped-down diaphragm aperture. Subsequently switch S4 is opened and thereafter the shutter speed is controlled according to the stored voltage in the same manner as has been described. Meanwhile, switch S8 interrupts the operation of electromagnet Mg1, after the diaphragm has been adjusted.

A voltage at point Q higher than that at point P signifies that the shutter speed which has been manually selected is higher than that shutter speed required with fully open diaphragm light measuring. In this case, the pointer of voltmeter M will be fully deflected to the opposite extremity, with the diaphragm remaining opened, whereby the shutter speed is controlled according to the stored value of capacitor C1.

Figure 3:
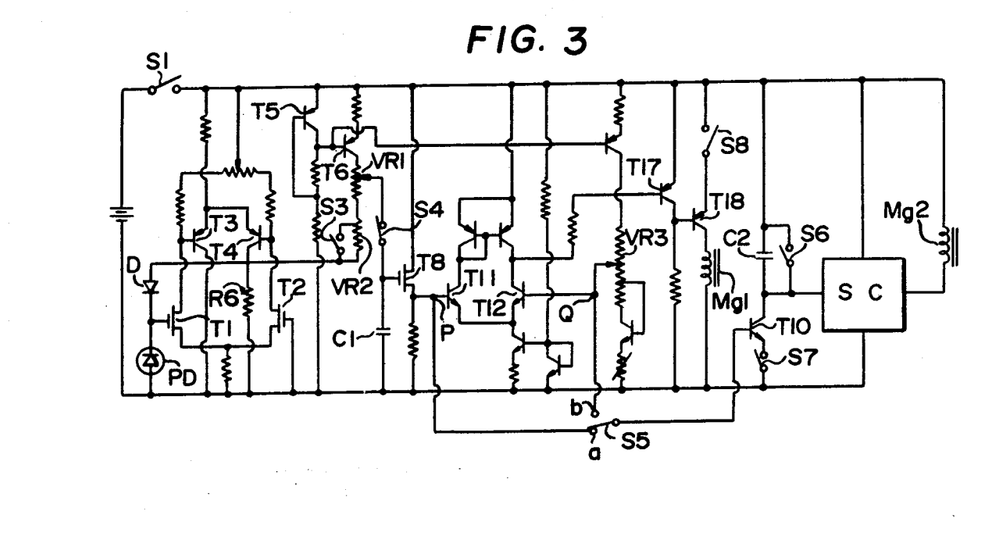
FIG. 3 is a schematic of the second embodiment of the present invention.

FIG. 3 shows the second embodiment of the present invention, directed to detecting circuit 6 shown in FIG. 1 and does not include voltmeter M of FIG. 2. Like parts are designated like reference numerals throughout FIGS. 2 and 3. The detecting circuit in this embodiment is a differential amplifier consisting of transistors T11 and T12, wherein when the voltage at point P is higher than that at point Q, transistor T12 will be interrupted to interrupt transistor T17, thereby making transistor T18 conductive to excite electromagnet MG1. However, when the voltages at points P and Q are equal, then transistor T12 is conductive, while transistor T18 will be interrupted, releasing electromagnet Mg1.

In the case of exposure control with the shutter speed selected beforehand, the shutter speed controlling voltage for fully open diaphragm light measuring appears at point P, in the initial stage of the depression of the shutter button. However, as the diaphragm is being closed with the depression of the shutter button, the output from the light measuring circuit is lowered, and then the voltage at point P is lowered. When the voltage at point P is equal to the voltage at point Q, electromagnet Mg1 is released, thereby clamping the diaphragm at its diaphragm aperture setting.

Figure 4:
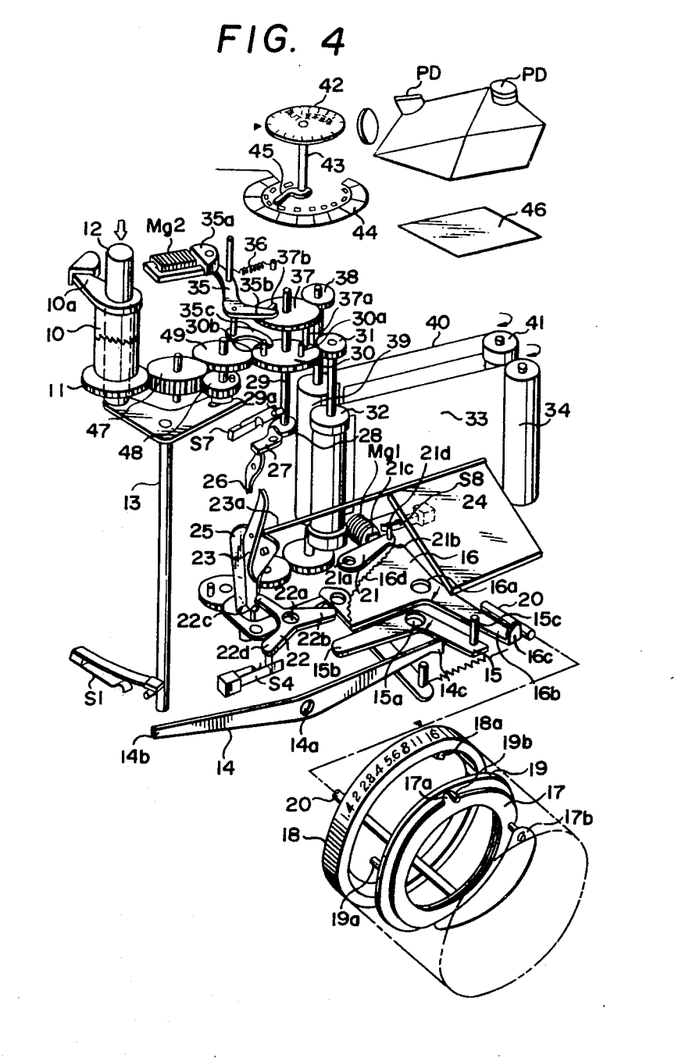
FIG. 4 is a perspective view of the camera mechanism used in the embodiments of the invention.

FIG. 4 shows a camera mechanism in a winding-completed condition. This embodiment relates to stopped-down light measuring. Release button 12 is movable vertically within take-up shaft 10 having winding lever 10a and engaged by rod 13 having a tendency to ascend by a spring (not shown). When lowered in the direction shown by the arrow, pin 13a closes power source switch S1. Rod 13 is rotatable and is urged under the action of a spring (not shown) to engage one end of release rod 14 positioned as shown, to rotate the same in the counterclockwise direction about shaft hole 14a, thereby disengaging ratchet 14c from lever 15. Lever 15 is rotatably journalled in shaft hole 15a, and loaded by a spring (not shown) to rotate in the clockwise direction, while pin 15c thereof is rotatably journaled in shaft hole 16a in a similar manner, thus engaging arm 16b of sector shaped lever 16 having a tendency to rotate in the clockwise direction and to be arrested in that position. Formed on the arm 16b of sector shaped lever 16 is angled projection 16c as well as arcuately shaped sector teeth 16d.

Diaphragm presetting ring 18 is used to initially manually set the diaphragm aperture to a desired setting by aligning the graduations thereof with an index on the camera. Pins 19a, 19b projected from interlocking ring 19 have a tendency to rotate in the clockwise direction and are disposed concentrically with respect to diaphragm presetting ring 18. Thus, when ring 18 is rotated clockwise, pin 19a engages projection 18a to lock diaphragm presetting ring 18, while interlocking pin 29 projecting from interlocking ring 19 engages angled projection 16c, whereby rotation of ring 19 is controlled when sector shaped lever 16 is stopped. Diaphragm ring 17 has a tendency to rotate in the clockwise direction and follows the rotation of interlocking ring 19 due to the engagement of projection 17a with pin 19b, to thereby rotate diaphragm blade 17b (one of the blades 17b only being shown) to determine the diaphragm aperture.

Diaphragm control lever 21 is rotatably journaled in shaft hole 21a and has a tendency to rotate in the clockwise direction. Lever 21 is formed with locking ratchet 21b engageable with ratchet teeth 16d of sector shaped lever 16, armature 21c attracted by electromagnet Mg1, and pin 21d to actuate switch S8. Thus, when electromagnet Mg1 is excited, lever 21 rotates in the counterclockwise direction to bring locking ratchet 21b to a position retracted from ratchet teeth 16d, and pin 21d closes switch S8 to connect electromagnet Mg1 to a power source. When the excitation to electromagnet Mg1 is interrupted, lever 21 rotates clockwise to bring locking ratchet 21b in engagement with teeth 16d, thus preventing sector shaped lever 16 from rotating, while pin 21d opens switch S8.

Trifurcated lever 22 has arm 22b engageable with arm 15b, when lever 15 is rotated clockwise, arm 22c engageable with mirror lever 23 having a tendency to rotate in the counterclockwise direction about shaft hole 23a, and arm 22d controlling the actuation of switch S4. As has been described previously, mirror lever 23 rigidly mounts movable mirror 24 on shaft 23a and has a tendency to rotate in the counterclockwise direction by means of a spring (not shown) to position movable mirror 24 in its viewing position. When engaging arm 22c rotates movable mirror 24 to a picture taking position, the aforesaid engagement with arm 22c is released. Also, lever 25 returns movable mirror 24 from its picture taking position to its viewing position. Focussing glass 46 is part of the view finder. Intermediate lever 26 rotates in engagement with the rotation of mirror lever 23 and engages forward curtain locking lever 27 to rotate the same, locking lever 27 having locking ratchet 27a on one end.

Rigidly mounted on shaft 29 are forward curtain locking cam 28, the rotation of which is stopped due to its engagement with locking ratchet 27a, and forward curtain gear 30 having pins 30a and 30b projecting therefrom. Forward curtain 33 extends between forward curtain winding shaft 32 having gear 31 meshing with forward curtain gear 30 and forward curtain take-up shaft 34 having a tendency to rotate in the clockwise direction.

Rear curtain gear 37 is loosely journaled on shaft 29, and includes projecting pins 37a and 37b. Gear 37 meshes with gear 38 which is rigidly mounted on rear curtain winding shaft 39. Rear curtain 40 extends between rear curtain winding shaft 39 and rear curtain take-up shaft 41 having a tendency to rotate in the clockwise direction. When shaft 29 is rotated clockwise, pin 30a is engageable with pin 37a. When take-up shaft 10 is rotated counterclockwise by the winding operation, forward curtain gear 30 rotates clockwise by gears 11, 47, 48 and 49, while rear curtain gear 37 also rotates clockwise due to the engagement with both pins 30a and 37a.

When forward curtain 33 is taken up around forward curtain take-up shaft 32 due to the rotation of forward curtain gear 30, pin 30b engages lever 35c to rotate it counterclockwise. Rear curtain locking lever 35 rotates together, but coaxially, with lever 35c and has a tendency to rotate clockwise by spring 36. Lever 35 has armature 35a cooperating with electromagnet Mg2 at its one end and ratchet 35b engageable with pin 37b on rear curtain gear 37, after rotating clockwise, as has been described previously, to wind rear curtain 40 around winding shaft 39. The counterclockwise rotation of lever 35c rotates rear curtain locking lever 35 against the force of spring 36, thereby urging armature 35a against electromagnet Mg2, upon completion of shutter cocking.

Shaft 43 rigidly mounts thereon shutter speed dial 42 for manually selecting the shutter speed. Mounted on shaft 43 is slider 45 which slides on resistor 44 when shaft 43 rotates. Potentiometer VR3 consists of slider 45 and resistor 44. When effecting exposure control, with the diaphragm aperture adjusted beforehand, the voltage to be produced at slider 45 is zero by aligning shutter speed dial 42 with an automatic scale. The potential at point Q is also zero.

With the aforesaid arrangement, in the case of exposure control with the diaphragm aperture adjusted beforehand, switch S3 is maintained open in this embodiment because it is directed to stopped-down diaphragm light measuring. In this case, shutter speed dial 42 is aligned with an automatic scale, and diaphragm presetting ring 18 is aligned with the desired diaphragm aperture, and then the shutter is released in the condition as shown in FIG. 4. Rod 13 descends to close power source switch S1, and the light measuring circuit operates, followed by releasing of lever 15 from its locked condition due to the rotation of release rod 14. Accordingly, lever 15 rotates clockwise, whereupon sector shaped lever 16 likewise rotates clockwise.

At this time, the potential at point Q is zero, so that electromagnet Mg1 is maintained excited, regardless of the potential at point P, whereby sector shaped lever 16 is not locked by diaphragm control lever 21. Interlocking pin 20 follows sector shaped lever 16, while interlocking ring 19 continues to rotate, until pin 19a engages projection 18a of diaphragm presetting ring 18, whereby diaphragm ring 17 is rotated to set the diaphragm to a pre-adjusted diaphragm aperture. Lever 15, which continues to rotate after the aforesaid diaphragm aperture has been adjusted, rotates trifurcated lever 22 counterclockwise to thereby release mirror lever 23 by arm 22c, whereupon arm 22d opens switch S4, thereby storing in capacitor C1 the output from computing circuit 3 which has computed the output from light measuring circuit 1 at the aforesaid adjusted diaphragm aperture and the film sensitivity.

Due to the release of mirror lever 23 from its locked condition, movable mirror 24 moves from the viewing position to the picture taking position, while lever 23 releases the locked condition of forward curtain locking cam 28 caused by the forward curtain locking lever 27, by way of intermediate lever 26, thus causing forward gear 30 to rotate along with shaft 29. Pin 29a of shaft 29 closes trigger switch S7 to thereby start the charging of integrating capacitor C2, whereupon forward curtain 33 starts the exposure in synchronism therewith.

When integrating capacitor C2 reaches a given voltage, switching circuit SC interrupts the excitation of electromagnet Mg2, while rear curtain locking lever 35 rotates clockwise by means of spring 36 to release the locked condition of rear curtain gear 36, followed by termination of exposure by rear curtain 40, thus controlling the shutter speed.

However, when the exposure control is effected, with the shutter speed selected beforehand, the shutter speed is selected to the desired speed by rotating dial 42, and diaphragm presetting ring 18 is set, for instance, to the minimum diaphragm aperture, although ring 18 may be set arbitrarily in this case. Similarly, switch S3 is maintained open because of the stopped-down diaphragm light measurement.

When the control circuit is operated due to the closing of power source switch S1 caused by the releasing operation, light measuring circuit 1 first transmits its output with the diaphragm in the fully open condition to computing circuit 3, whereby the output signal obtained by the computation of the light measuring output and the film sensitivity are input to the base of transistor T11 of the differential amplifying circuit, constituting the detecting circuit 7, through switch S4 in its closed position. However, the voltage at sliding terminal 45 of potentiometer VR3 commensurate with the selected shutter speed is input to the base of the other transistor T12 of the differential amplifying circuit.

Assuming that the potential at point P is higher than the potential at point Q, then transistor T18 is conductive and the electromagnet Mg1 is excited to attract armature 21c of diaphragm control lever 21, wherby pin 21d maintains switch S8 closed. Subsequently, when rod 13 rotates release rod 14, lever 15 is released from its locked condition, whereupon lever 15 and sector shaped lever 16 both rotate clockwise. Interlocking ring 19 rotates clockwise by means of interlocking pin 20 which follows sector shaped lever 16, so that the diaphragm may be closed to the pre-adjusted diaphragm aperture from its fully open condition. Accordingly, the potential at point P is gradually lowered, with a decrease in the output of light measuring circuit 1. When the potential at point P becomes equal to the potential at point Q before the diaphragm reaches the pre-adjusted diaphragm aperture, the condition of transistors T17 and T18 is reversed, whereby the excitation of electromagnet Mg1 is interrupted. As a result, diaphragm control lever 21 rotates clockwise, and locking ratchet 21b engages ratchet teeth 16d to thereby lock sector shaped lever 16 in position, thereby opening switch S8. Accordingly, interlocking ring 19 is locked and the diaphragm aperture is controlled.

Then, the output from light measuring circuit 1 in accordance with the controlled diaphragm aperture is computed or added to the film sensitivity, and the output therefrom is stored in capacitor C1 through closed switch S4. Lever 15 continues rotating, and when it engages trifurcated lever 22, then switch S4 is opened and the locked condition of mirror lever 23 is released.

Subsequently, the exposure proceeds in a manner similar to the case for exposure control, with the diaphragm aperture adjusted beforehand, whereupon the current obtained by anti-logarithmetically converting the voltage of capacitor C1, which is related to the output from the light measuring circuit with the controlled diaphragm aperture and the film sensitivity, is input to the collector of transistor T10, whereby integrating capacitor C2 is charged. Thus, when the charging reaches a given level, the exciting current to electromagnet Mg2 is interrupted as has been described, and the exposure is terminated. The shutter speed controlled at this time will be slightly different from the selected shutter speed, because of the equal potential of both points P and Q and because the shutter speed is controlled commensurate with the adjusted diaphragm aperture, with errors introduced due to the minute delay caused until sector shaped lever 16 is locked by means of diaphragm control lever 21.

When the potential at point P is equal to that at point Q for fully open diaphragm light measuring, diaphragm control lever 21 locks sector shaped lever 16 in position before commencement of the rotation thereof, whereby an optimum exposure is effected at the shutter speed selected with the diaphragm in the fully open light measuring condition.

In the aforesaid case, when the brightness of an object is so intense that the potential at point P will not be lower than the potential at point Q, even if the diaphragm aperture is adjusted to the pre-adjustment diaphragm aperture, say, F: 16, optimum shutter speed control is effected at the pre-adjusted diaphragm aperture F: 16. In this case, the shutter speed to be controlled will be higher than the selected shutter speed, although optimum exposure is achieved.

To the contrary, in case the potential at point P is lower than that at point Q with fully open diaphragm light measuring condition, the excitation of electromagnet Mg1 is immediately interrupted, so that diaphragm lever 21 locks sector shaped lever 16, prior to commencement of the rotation thereof. As a result, the diaphragm is maintained fully opened and then, in such a condition, optimum shutter speed is controlled for the brightness of an object. In this case, as well, the shutter speed to be controlled may possibly be lower to a large extent than the selected shutter speed, although optimum exposure is achieved.

Figure 5:
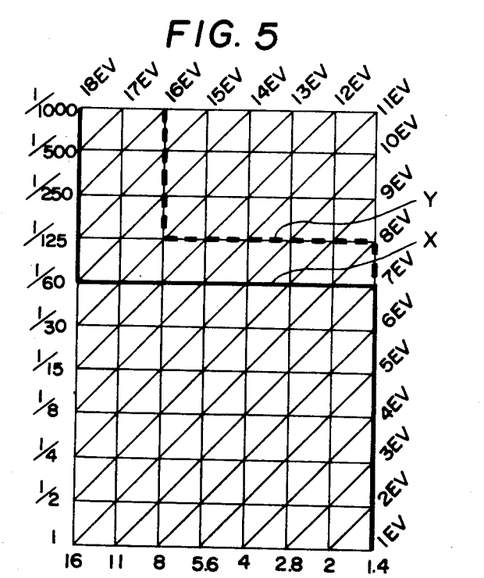
FIG. 5 is a graph illustrating exposure control effected in the range of the diaphragm aperture from its fully open position to its pre-adjusted position.

Referring to FIG. 5, assuming that the shutter speed is selected to 1/60 second and diaphragm ring 18 is set to the minimum diaphragm aperture of F: 16, then the diaphragm will be automatically controlled from the fully open diaphragm aperture value of F: 1.4 to the minimum diaphragm aperture value of F: 16, at the aforesaid selected shutter speed of 1/60 second and with a range of brightness from 7 EV to 18 EV. However, the diaphragm will be maintained at the minimum diaphragm aperture of F: 16 with a brightness of 18 EV, while the shutter speed will be automatically controlled in the range from the preselected shutter speed of 1/60 second to the maximum shutter speed of 1/1000 second, commensurate to the brightness of the scene light which has been transmitted through the diaphragm aperture. When the EV value of an object is below 7 EV, then the diaphragm aperture will be maintained at a fully open diaphragm aperture value of F: 1.4, whereby the shutter speed will be automatically controlled from the selected speed of 1/60 second to 1 second by means of the scene light which has been transmitted through the aforsaid fully open diaphragm aperture, thereby effecting a programmed exposure control shown by the solid line of FIG. 5. In contrast thereto, when the shutter speed is selected as 1/125 second and diaphragm adjusting ring 18 is set to F: 8, then the EV value of an object ranging from 8 EV to 13 EV will be automatically controlled from the fully open aperture value of F: 1.4 to the pre-adjusted value of F: 8 at the selected shutter speed of 1/125 second, for exposure control. However, when the EV value exceeds 13 EV, the shutter speed is controlled by the scene light transmitted through the pre-adjusted diaphragm aperture set at F: 8. In this respect, the shutter speed is automatically controlled between 1/125 second and 1/1000 second for exposure control. However, when the EV value is below 8 EV, the diaphragm is maintained at the fully open aperture value of F: 1.4, while the shutter speed is controlled by the scene light transmitted through the aforesaid diaphragm aperture in a manner to be automatically controlled from the selected 1/125 second to 1 second, for exposure control. The programming is as shown by the broken line Y in FIG. 5.

In other words, the present invention enables the exposure to be programmed, wherein the exposure control may be changed as required by the user, by selecting the shutter speed beforehand and arbitrarily setting the diaphragm aperture by means of a diaphragm adjusting ring, whereby there may be effected an exposure control by utilizing the brightness of an object in the exchangeable lens, the stop-down function of the diaphragm and the shutter speed of the camera.

Figure 6:
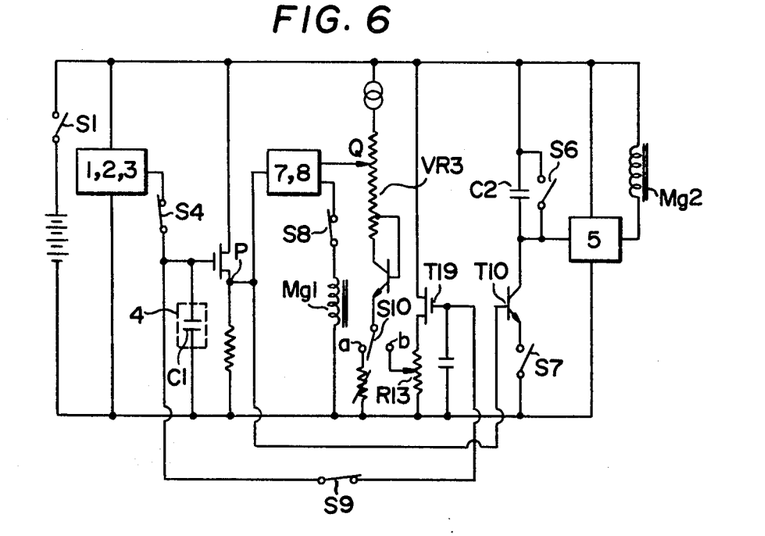
FIG. 6 is a schematic of the third embodiment of the present invention.

FIG. 6 is a circuit diagram of another embodiment which enables programming control of the shutter speed and diaphragm aperture, wherein the reference numerals 1, 2, 3, 4, 5, 7 and 8 are used in common with FIG. 3.

Potentiometer VR3 produces the selected shutter speed as in the aforesaid embodiment, switch S10 being connected in series with potentiometer VR3. The output from computing circuit 3, i.e., the shutter speed control signal is connected by switch S9 to the gate of FET 19, and resistor 13 is connected to FET 19 as an output resistor thereof which is used as a source follower, with the slider terminal of resistor 13 connected to contact b of switch S10. When switch S10 is connected to contact a and switch S9 is maintained open, then the circuit will function in the same manner as the circuit shown in FIG. 3. When switch S9 is closed and switch S10 is connected to contact b, then exposure programming control may be effected.

Figure 7:
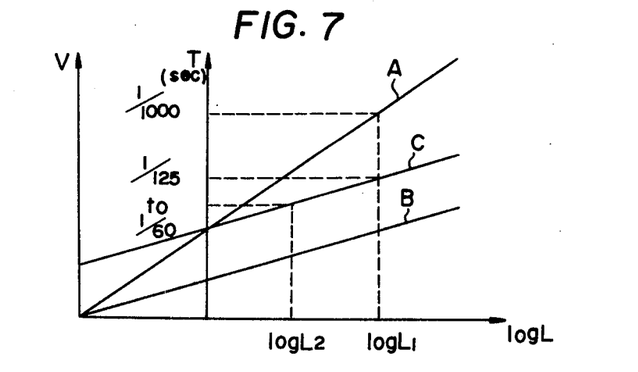
FIG. 7 is a graph illustrating the operation of the aforesaid embodiments.

This is possible because one end of potentiometer VR3 is connected to the sliding terminal of variable resistor R13, and the same input voltage as that of the gate of FET T8, i.e., the shutter timing signal in the diaphragm fully open condition, is impressed on the gate of FET 19. Accordingly, a divided voltage is produced by the sliding terminal of variable resistor R13. With exposure control wherein the shutter speed is selected beforehand as in the aforesaid embodiments, the potential at point Q at the signal voltage of the selected shutter speed is maintained constant all the time, unless the selected shutter speed is changed. In Contrast thereto, with exposure programming control, the potential at point Q should be varied depending on the brightness of an object, and furthermore, the extent of the variation thereof should be compressed to several fractions of the variation of the potential at point P. FIG. 7 shows the relationship between the voltages at points P and Q versus the logarithmic value of the brightness of an object.

In FIG. 7, the logarithmic value of the brightness of an object is represented on the abscissa and the voltage is represented on the ordinate. Line A represents the voltage variation at point P, while line B represents the voltage to be produced at the sliding terminal of variable resistor R13, and line C represents the voltage variation at point Q. Line C may be obtained by shifting line B parallel therewith. Thus, the extent of the shifting of line B represents a voltage in the range from the connecting terminal on the side of the sliding terminal of variable resistor R13 of potentiometer VR13 to point Q. For instance, when the logarithmic value of the brightness of an object is log L1, if the shutter time of the shutter speed control signal at point P is 1/1000 second and the shutter time of the selected shutter speed depending on the voltage at the point Q is 1/125 second, the difference between both points controls the diaphragm by means of detecting circuit 7 and diaphragm control member 8. In a similar manner, in case the logarithmic value of the brightness of an object is log L2, the diaphragm is controlled by the difference between the signal at point Q of the selected shutter speed on line B and the signal at point P of the shutter speed on line A which intersects therewith.

With the circuit shown in FIG. 6, since the output from the computing circuit has been added to the output from the signal generating circuit of the selected shutter speed, line C intersects with the line A, while the shutter speed and diaphragm aperture to be controlled commensurate with the brightness of an object are varied.

The point on line A intersecting with line C as well as the gradient of line C may be selected arbitrarily by adjusting the position of the sliding terminal of variable resistor R13 and potentiometer VR3. Thus, if the voltage at the intersection of the two lines is selected as the minimum shutter speed which would not result in hand blur of the photograph, exposure programming control may be effected which covers the brightness of an object, until the highest shutter speed is achieved by adjusting the diaphragm from its fully open diaphragm aperture to the minimum diaphragm aperture.

While we have shown and described certain present preferred embodiments of the invention, it is to be distinctly understood that the invention is not limited thereto but may be otherwise variously embodied within the scope of the following claims.

What is claimed is:

1. An exposure control device for a photographic camera comprising:
   an objective lens;
   a diaphragm;
   diaphragm controlling means movable from an initial to a terminal position for varying the aperture size of said diaphargm;
   manually selectable diaphragm setting means for pre-setting a first position to stop the movement of said diaphragm controlling means;
   means for manually selecting shutter speed and for generating an electrical signal representative thereof;
   means for measuring the scene light transmitted through said objective lens and diaphragm to produce a light measuring output;
   a circuit generating an output signal commensurate with said light measuring output;
   automatic diaphragm setting means for determining a second position to stop the movement of said diaphragm controlling means in accordance with said electrical signal and said output signal while said first position is pre-set by said manual diaphragm setting means, whereby said diaphragm controlling means is stopped at said first position when said first position is closer to said initial position than said second position to be determined and said diaphragm controlling means is stopped at said second position when said second position is determined between said initial position and said first position;
   means for storing said output signal prior to the commencement of the exposure; and
   means for controlling the shutter speed according to said stored output signal upon exposure.

2. An exposure control device for a photographic camera as in claim 1, wherein said circuit comprises:
   means for generating a combined signal representing the film sensitivity and the diaphragm aperture selected by said manual diaphragm setting means; and
   means for computing said output signal from said combined signal and said light measuring output.

3. An exposure control device for a photographic camera as in claim 2, wherein said means for generating a combined signal includes switching means for transmitting or interrupting the transmission of the diaphragm aperture setting to said means for computing.

4. An exposure control device as in claim 3, wherein said means for storing is adapted to store said output signal with said diaphragm controlling means at said initial position as said switching means transmits the manually selected diaphragm aperture setting to said means for computing.

5. An exposure control device as in claim 1, further comprising means for adapting said means for storing to store said output signal after said diaphragm controlling means has been stopped.

6. An exposure control device as in claim 5, wherein said automatic diaphragm setting means comprises means for comparing said output signal of said circuit with said electrical signal representative of the selected shutter speed, means responsive to said comparing means for stopping the movement of said diaphragm controlling means when a predetermined relationship exists between said output signal and said electrical signal before said diaphragm controlling means arrives at said first position.

7. An exposure control device as in claim 6, wherein said means for manually selecting shutter speed includes means for selectively generating an electrical signal with which said output signal of said circuit is unable to be brought into said predetermined relationship.

8. An exposure control device as in claim 5, further comprising means for selectably disabling the operation of said automatic diaphragm setting means.

9. An exposure control device as in claim 8, wherein said means for selectably disabling includes means for generating an electrical signal for disabling the operation of said automatic diaphragm setting means.

10. An exposure control device as in claim 5, wherein said means for manually selecting shutter speed includes means for selectively generating another electrical signal in place of the electrical signal representative of the shutter speed, and the operation of said automatic diaphragm setting means is disabled in response to said another electrical signal.

11. An exposure control device as in claim 5, wherein said circuit comprises means for adding a signal representing the film sensitivity to said light measuring output upon generating said output signal.

12. An exposure control device for a photographic camera comprising:
   an objective lens;
   a diaphragm;
   diaphragm controlling means movable from an initial to a terminal position for varying the aperture size of said diaphragm;
   manually selectable diaphragm setting means for presetting a first position to stop the movement of said diaphragm controlling means;
   means for manually selecting shutter speed and for generating an electrical signal representative thereof;
   means for measuring the scene light transmitted through said objective lens and diaphragm to produce a light measuring output;
   a circuit generating an output signal commensurate with said light measuring output;
   automatic diaphragm setting means for determining a second position to stop the movement of said diaphragm controlling means in accordance with said electrical signal and said output signal while said first position is pre-set by said manual diaphragm setting means, whereby said diaphragm controlling means is stopped at said first position when said first position is closer to said initial position than said second position to be determined and said diaphragm controlling means is stopped at said second position when said second position is determined between said initial position and said first position;
   means for storing said output signal prior to the commencement of the exposure; and
   means for selectively controlling the shutter speed according to said stored output signal or said electrical signal representative of the selected shutter speed.

* * * * *